United States Patent
Li et al.

(10) Patent No.: US 12,313,754 B2
(45) Date of Patent: May 27, 2025

(54) DIGITAL ASSOCIATION AND HIGH PRECISION POSITIONING AND TRACKING SYSTEM FOR MULTIMODAL TRANSPORT CONTAINER

(71) Applicant: WUHAN UNIVERSITY OF TECHNOLOGY, Wuhan (CN)

(72) Inventors: Wenfeng Li, Wuhan (CN); Wenwen Zhang, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 451 days.

(21) Appl. No.: 17/849,742

(22) Filed: Jun. 27, 2022

(65) Prior Publication Data

US 2023/0184959 A1 Jun. 15, 2023

(30) Foreign Application Priority Data

Dec. 9, 2021 (CN) .......................... 202111501010.X

(51) Int. Cl.
*G01S 19/48* (2010.01)
*G01S 19/26* (2010.01)
(Continued)

(52) U.S. Cl.
CPC .............. *G01S 19/48* (2013.01); *G01S 19/26* (2013.01); *G01S 19/45* (2013.01); *G01S 19/11* (2013.01);
(Continued)

(58) Field of Classification Search
CPC ...... G01S 19/246; G01S 19/393; G01S 19/11; G01S 19/14; G01S 19/26; G01S 19/50; G01S 19/48; G01S 19/45; G01C 21/28
(Continued)

(56) References Cited

U.S. PATENT DOCUMENTS 9,020,536 B1 * 4/2015 Crossno ............. G06Q 10/0833
455/67.11
9,470,797 B2 * 10/2016 Walgren .................. G01S 19/14
(Continued)

FOREIGN PATENT DOCUMENTS

CN 112349072 A * 2/2021 ............. G08B 21/18
CN 113109842 A * 7/2021 ............. G01S 19/14
(Continued)

*Primary Examiner* — Chuong P Nguyen

(57) ABSTRACT

Disclosed is a digital association and high precision positioning and tracking system for multimodal transport container, comprising a carrier terminal, a container terminal, and a remote digital monitoring platform; the carrier terminal is activated when the a container is in an associated state, and is used to collect high-precision positioning information and other status information of the container and send it to the remote digital monitoring platform; the container monitoring terminal is enabled when the container is in a non-associated state, and is used to collect container status information and send it to the remote digital monitoring platform; the remote digital monitoring platform is used to record and visualize relevant information; the carrier-container association and binding module sends instructions to the carrier terminal and the container monitoring terminal to complete the container-carrier association and unbinding, ensuring the security and positioning accuracy of the container during the multimodal transport process.

8 Claims, 5 Drawing Sheets

(51) Int. Cl.
*G01S 19/45* (2010.01)
*G01S 19/11* (2010.01)
*G01S 19/24* (2010.01)
*G06Q 10/0833* (2023.01)

(52) U.S. Cl.
CPC ........ *G01S 19/246* (2013.01); *G06Q 10/0833* (2013.01)

(58) Field of Classification Search
USPC ......... 342/350, 352, 357.31, 357.52, 357.65, 342/357.28
See application file for complete search history.

(56) References Cited

U.S. PATENT DOCUMENTS

| | | | |
|---|---|---|---|
| 10,679,173 B2* | 6/2020 | Olsen | H04W 4/029 |
| 10,957,204 B1* | 3/2021 | Kumar | G08G 1/20 |
| 11,119,224 B2* | 9/2021 | Kilburn | G01S 19/48 |
| 11,578,978 B1* | 2/2023 | Hickey | G08G 1/207 |
| 12,069,542 B1* | 8/2024 | Atkinson | H04W 4/029 |
| 2021/0350318 A1* | 11/2021 | Williamson | H04W 4/029 |

FOREIGN PATENT DOCUMENTS

| | | | | |
|---|---|---|---|---|
| CN | 216852356 U | * | 6/2022 | G01S 19/42 |
| KR | 20140085277 A | * | 7/2014 | G06Q 10/08 |

* cited by examiner

DIGITAL ASSOCIATION AND HIGH PRECISION POSITIONING AND TRACKING SYSTEM FOR MULTIMODAL TRANSPORT CONTAINER

FIELD OF THE DISCLOSURE

The disclosure relates to the technical field of container positioning, in particular to digital association and high precision positioning and tracking system for multimodal transport container.

BACKGROUND

The transportation industry represented by the logistics transportation service industry uses satellite positioning and navigation system to realize the full monitoring and visual management of the running status of goods and vehicles. Containers, as the carrying unit of logistics transportation, have higher and higher requirements for remote monitoring and in-transit tracking of containers during transportation. Enterprises such as GE in the United States and CIMC in China have proposed the concept of smart containers, which collects container status, location, and other information through intelligent container terminals, and communicates with remote monitoring platforms through cellular networks and satellite networks. On this basis, most of the container positioning and tracking in China use GPS and Beidou to achieve continuous positioning and tracking of containers, or through scanning RFID or barcode on containers at fixed logistics nodes, reading goods information and matching the database to achieve point-to-point tracking of goods.

The prior art mainly has the following problems: (1) Container positioning equipment is usually installed on the container shell, which is powered by micro-battery, while the container transportation period is long, and the power consumption of positioning and communication is large, which will be in a state of unmanned maintenance for a long time; (2) The container collects low-precision and low-frequency positioning trajectory data during transportation, and when the container is in complex environments such as tunnels, elevated buildings, and tall buildings, the signal is lost, resulting in decreased positioning accuracy, trajectory loss, and trajectory drift. etc., and the cost of installing a high-precision positioning module on the container is too high. (3) The multimodal transport of the container involves multiple transport scenarios such as public rail and water. The high-precision positioning of containers can provide more real-time and accurate container transfer information for the handover and production of goods and the formulation of transport plans. The application of existing container positioning technology on this level is not reflected.

SUMMARY

The purpose of this disclosure is to overcome the above technical deficiencies and provide a digital association and high precision positioning and tracking system for multimodal transport container.

The beneficial effects of this disclosure include: through the digital association between the carrier and the container, the positioning of the container is divided into two stages: the associated state positioning and the non-associated state positioning, so as to realize the high-precision positioning and safety guarantee of the container in transit. When the container is in an associated state, higher-precision container positioning data can be indirectly obtained by means of the high-precision positioning and status data of the carrier. When the container is in a non-associated state (such as the yard storage state or the wrong handling state), starting the container terminal to obtain positioning and status data to ensure that the container is not stolen and transferred. In order to solve the problem of missing and drifting trajectory points in the positioning data, this disclosure proposes a data-driven machine learning trajectory point prediction and matching algorithm to obtain more precise container movement trajectories and positions. At the same time, the associated binding of the carrier and the container ensures the accuracy of positioning during the multimodal transport transfer process through multiple constraints of time and location.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
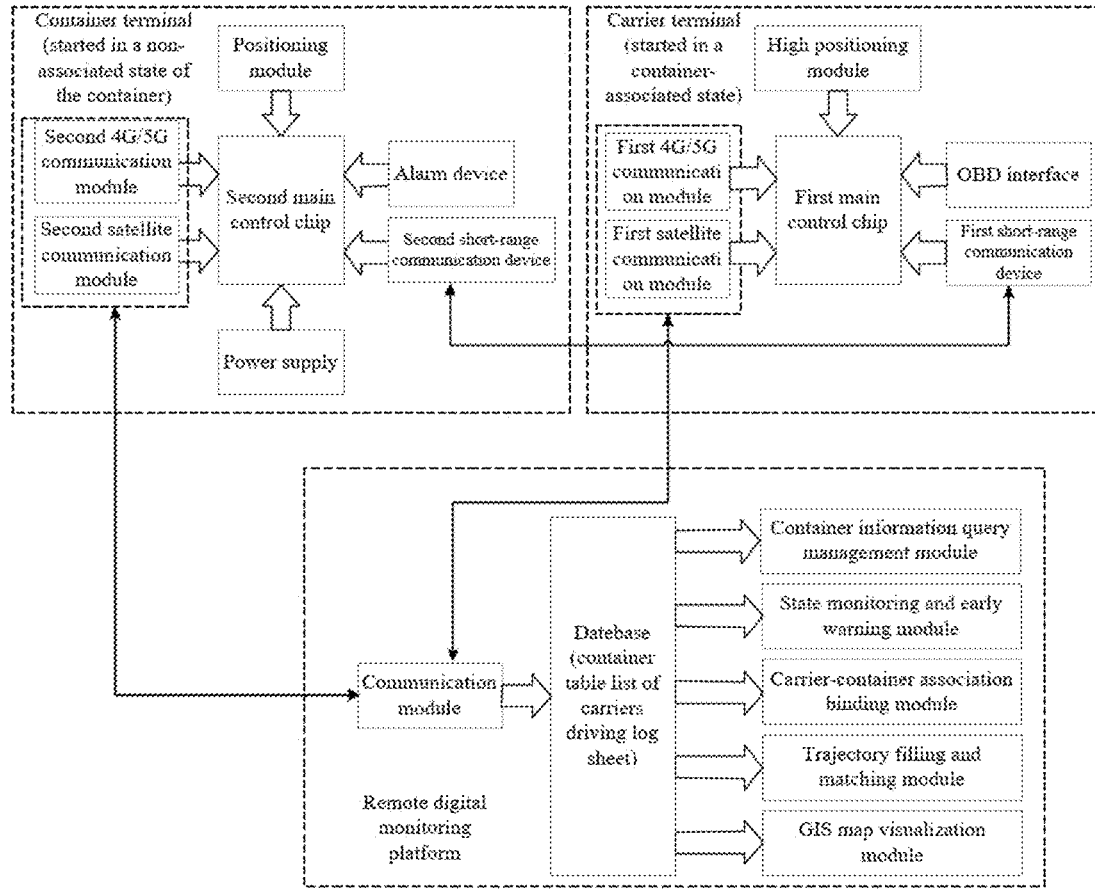
FIG. 1 is the structure diagram of an embodiment of digital association and high precision positioning and tracking system for multimodal transport container.

As shown in FIG. 1, this disclosure provides a digital association and high precision positioning and tracking system for multimodal transport container, comprising a carrier terminal, a container terminal, and a remote digital monitoring platform.

The carrier terminal is activated when a container is in an associated state, which is used to realize the matching of the container and the carrier, the collection of the high-precision positioning information of the container and other status information, and the transmission of the collected information to the remote digital monitoring platform.

The container monitoring terminal is activated when the container is in a non-associated state, which is used to match the container and the carrier, collect the container status information, and send the matching result and collected information to the remote digital monitoring platform.

The remote digital monitoring platform is used to send instructions to control the association and unbinding of the carrier and the container, and set the associated state or the non-associated state according to the matching result returned by the container; the remote digital monitoring platform also records and displays the identification information and status information of the carrier and the container according to the received information, and monitors the status of the container.

In this tracking system, the carrier terminal includes a first main control chip, a high-precision positioning module, an OBD interface, a first short-range communication device, and a first remote communication device; the first main control chip is respectively electrically connected with the high-precision positioning module, the OBD interface, the first short-range communication device and the first remote communication device;

The high-precision positioning module is used to obtain high-precision positioning information, and send the high-precision positioning information to the first main control chip;

The OBD interface is connected to the on-board diagnostic system of the carrier, so as to obtain the state information of the carrier, and send the state information of the carrier to the first main control chip;

The first short-range communication device is used for key matching with the second short-range communication device of the container monitoring terminal; the first short-range communication device is also used to acquire container information and sensor information, and send the acquired information to the first main control chip;

The first main control chip is used to control the high-precision positioning module, the OBD interface, the first short-range communication device, and the first remote communication device to work; and send the received information to the remote digital monitoring platform; The first short-range communication device includes but is not limited to RFID, Bluetooth, NFC, etc.

In this tracking system, the high-precision positioning information obtained by the high-precision positioning module includes: longitude and latitude, azimuth, instantaneous speed, and timestamp data of the carrier;

The state information of the carrier obtained by the OBD interface includes: engine speed, vehicle speed, and fuel consumption data of the carrier.

The information on the container read by the first short-range communication device includes identification information such as container number, type of goods, and quantity written into the container in advance; The information of the container sensor read by the first short-range communication device includes temperature, humidity, and pressure information of the container.

In this tracking system, the container monitoring terminal includes a second main control chip, a positioning module, a second short-range communication module, a second remote communication device, an alarm device, and a power supply; the second main control chip is respectively connected with the positioning module, the second short-range communication device, the second long-range communication device, the alarm device, and the power supply;

The positioning module is used to obtain the positioning information of the container in the non-associated state, and send it to the second main control chip;

The second short-range communication device is used for key matching with the first short-range communication device of the carrier terminal, and sends the matching result to the remote digital monitoring platform through the second remote communication device; the second short-range communication device is further configured to acquire the data information sent by the sensor after being activated, and forward it to the second main control chip; The second short-range communication device includes but is not limited to RFID, Bluetooth, NFC, etc.;

The alarm device is used to issue an alarm when the carrier and the container are incorrectly matched;

The power supply is used to supply power to the container monitoring terminal;

The second main control chip is used to control the positioning module, the second short-range communication device, the second remote communication device and the alarm device to work, and send the received information to the remote digital monitoring platform.

In this tracking system, the container monitoring terminal is attached to the outer wall of the container or hung on the door of the container in the form of an electronic lock.

In this tracking system, the remote digital monitoring platform includes a trajectory filling and matching module, a GIS map visualization module, a container information query management module, a state monitoring and early warning module, a carrier-container association binding module, a communication module, and a database;

The communication module is used to receive the information sent from the carrier terminal and the container monitoring terminal, and send data and control instructions to the carrier terminal and the container monitoring terminal;

The database is used to save the information received from the carrier terminal and the container monitoring terminal, and the received information includes the static identification data and dynamic status data of the carrier and the container;

The carrier-container association and binding module is used to realize the association and binding of the container and the carrier;

The container information query management module is used to access the carrier and container data in the database;

The trajectory completion and matching module is used to read trajectory dynamic data of the container from the database, and fill and match the trajectory data of the container, so as to realize the correction of the trajectory data of the container;

The GIS map visualization module is used to display the corrected container trajectory data on an electronic map;

The state monitoring and early warning module is used to compare the dynamic data of the carrier and the container with a preset threshold, and alarm when the preset threshold is exceeded.

In this tracking system, the database includes a container table, a carrier table, and a travel log table;

The container table records the relevant attribute information of the container, including container number, cargo information, origin, and destination information, of which the container number is the main keyword;

The carrier table records the relevant attribute information of the carrier, including carrier number and driver information, where the carrier number is the main keyword;

The container log table records the running track of the container, including container number, latitude, and longitude, receiving time, temperature and humidity, and pressure, of which the container number is the main keyword.

In this tracking system, the carrier-container association and binding module is used to implement the association binding between the container and the carrier; before the container is loaded on the carrier, the remote digital monitoring platform issues the master key to the carrier terminal; when the container enters the identification range of the carrier's first short-range communication device, key matching is performed, and the matching result is returned to the remote monitoring digital platform through the second remote communication device; if the match is successful, the container is set to the associated state; in the associated state, the remote digital monitoring platform sends an instruction to enable the carrier terminal; if the match is unsuccessful, the alarm device of the container monitoring terminal will give an alarm, and the container will be set to a non-associated state by requesting the remote digital monitoring platform to unbind the container-carrier; in the non-associated state, the remote digital monitoring platform will send instructions to enable the container monitoring terminal.

In this tracking system, the trajectory completion and matching module includes a trajectory preprocessing module, a road network data preprocessing module, a missing trajectory point prediction module, a candidate road segment screening module, a joint probability calculation module, and a road segment matching module;

The trajectory preprocessing module is used to preprocess the trajectory dynamic data of the container, and send the preprocessed results to the missing trajectory point prediction module;

The road network data preprocessing module is used to preprocess the road network data in the area where the container is located, and send the preprocessed results to the missing trajectory point prediction module;

The missing trajectory point prediction module is used to predict the missing trajectory points of the container according to the results received from the trajectory preprocessing module, and send the predicted results to the candidate road segment screening module;

The candidate road segment screening module is used to create a candidate road segment set according to the prediction result sent by the missing trajectory point prediction module, and send the candidate road set to the joint probability calculation module;

The joint probability calculation module is used to calculate the product of the observation probability and the transition probability of the trajectory points according to the candidate road set; the result of the product is the joint probability of the trajectory points, and the joint probability of the trajectory points is sent to the road segment matching module;

The road segment matching module is used to gradually solve the joint probability of all reachable trajectory points from the starting trajectory point until the last trajectory point is reached; the optimal matching road segment is obtained by backtracking from the trajectory end point with the largest joint probability, which is the result of map matching, and the matching result is sent to the GIS map visualization module.

In this tracking system, the trajectory preprocessing module is used to extract the corresponding trajectory data from the database according to the positioning start and end time constraints for the association and binding of the container and the carrier; when the distance between adjacent track points does not exceed the set distance threshold and the speed is less than the speed threshold, it is determined that the track point is a redundant point and is deleted; when the speed exceeds the maximum speed limit or the latitude and longitude exceeds the geofence latitude and longitude limit, the track point is determined to be an abnormal point, and it is deleted, and the track point with the speed of 0 is deleted, and the track point with the missing latitude and longitude is deleted; and then the preprocessed results are sent to the missing trajectory point prediction module;

The road network data preprocessing module is used to obtain the road network data in the area, establish a directed graph to extract road nodes and road segments, add the intersection or end point of the road to a node set, and add the road segment between two nodes to an edge set; and then sending the preprocessed road network data results to the missing trajectory point prediction module;

The missing trajectory point prediction module is used to predict the longitude and latitude of the missing trajectory point of the container; when the carrier/container passes through the place where the satellite signal is blocked and the trajectory is missing, inputting the data of the N time points before the missing trajectory point into a trained LSTM network model, the predicted value is longitude and latitude of the time point, and the predicted longitude and latitude value is added to the original trajectory sequence, repeating this operation until the satellite signal returns to normal; during offline training, the longitude, latitude, time difference, distance, speed, and acceleration of trajectory data are selected as features, and the data of the first N time steps are extracted by sliding window as training samples, the LSTM model with multi-input-single-output long-short term memory network is input, and the N+1 data is used as a label to train the weight and bias through the model;

The candidate road segment screening module is used to create a candidate road segment set, determine an MBR area according to the positioning error of the used positioning equipment, and search for the adjacent nodes of each trajectory point in the trajectory sequence; if a road segment is within the MBR area and the speed limit value of the road segment is greater than the carrier speed, this road segment is added to the candidate road segment set, and the vertical projection point from the trajectory point to the candidate road segment is the candidate point;

The joint probability calculation module is used to calculate an observation probability and a transition probability of the trajectory point; when calculating the observation probability, the distance and direction factors are considered comprehensively; considering the distance factor, the distance between the preset observation point and the candidate point obeys a Gaussian distribution with a mean of 0 and a variance of the standard deviation of the positioning error; considering the direction factor, the observation probability is expressed as the cosine value of the direction angle of the candidate road segment and the direction angle of the carrier speed, and is limited to the range of 0~1, and the product of the two is used as the final observation probability; the observation probability of the road segment whose distance from the observation point exceeds the preset distance length is set to 0, and the transition probability is expressed as the exponential function of the difference between the observation distance of two adjacent trajectory points and the distance of the corresponding candidate point; and the smaller the difference between the two, the greater the probability of the candidate point, the product of the observation probability and the transition probability is the joint probability, and the calculation result is sent to the road segment matching module;

The road segment matching module is used to gradually solve the joint probability of all reachable trajectory points from the starting trajectory point until the last trajectory point is reached; the optimal matching road segment is obtained by backtracking from the trajectory end point with the largest joint probability, which is the result of map matching, and the road matching result is sent to the GIS map visualization module.

The principle of this disclosure will be further explained below with reference to FIG. 1 to FIG. 5.

A digital association and high precision positioning and tracking system for multimodal transport container, comprising a carrier terminal, a container terminal, and a remote digital monitoring platform. The structure diagram of the system is shown in FIG. 1.

(1) The carrier terminal is mainly responsible for the matching of the container and the carrier, the collection of high-precision positioning information of the container and other status information, and is used when the container is in an associated state. The carrier terminal includes a first main control chip, a high-precision positioning module, an OBD interface, a first short-range communication device, and a first remote communication device. The first remote communication device is also provided with a first 4G/5G communication module and a first satellite communication module.

The first main control chip is connected to the high-precision positioning module, the OBD interface, the first short-range communication device and the first remote communication device, and controls other modules to work through MCU. The high-precision positioning module obtains the carrier's latitude and longitude, direction angle, instantaneous speed, and timestamp data, and uses pseudo-range differential positioning to achieve sub-meter positioning accuracy. The OBD interface is connected to the carrier's on-board diagnostic system to obtain the carrier's engine speed, carrier's speed, fuel consumption, and other data. If the carrier does not have an on-board diagnostic system, it can also obtain motion status data through the relevant motion sensors in the container.

The first short-range communication device sends the master key information to the second short-range communication device of the container according to the master key received from the remote digital monitoring platform, and judges whether the container and the carrier match according to the returned information. The first short-range communication device also obtains information of electronic tags and sensors on the container. The end of the container close to the carrier is installed with an electronic label. The electronic label is written in advance with the container number, type of goods, quantity, and other identification information of the container through the system software and the card writer. This information can be read by the first short-range communication device of the carrier terminal or the tag reader at the logistics node (eg at the gate). Sensors include temperature, humidity, pressure, gyroscope, and acceleration sensors. They are installed at some key points on the inner wall of the container. The antenna is installed outside the vent or door. Considering the interference of metal to sensor data transmission and the nodes distributed in different positions in the container, the method of adding redundant antennas is adopted to expand the communication range. Both the electronic label and the label sensor are ultra-high frequency passive labels, which are rarely disturbed in harsh environments, and are suitable for the complex transportation environment of multimodal transport.

The first remote communication device completes the receiving of instructions and the sending of status information. In order to ensure the real-time and reliability of information transmission, dual-mode communication is adopted. 4g/5g communication is adopted where cellular network covers, and satellite communication is automatically switched where cellular network cannot cover. The carrier terminal packs all data and sends it to the remote digital monitoring platform through the first remote communication device in a certain format. The carrier terminal is powered by the carrier, which solves the problem of short battery life of the positioning device installed on the container.

(2) The container monitoring terminal is mainly responsible for the collection and transmission of container temperature, humidity, pressure, location, and other status information. It is used when the container is not associated with the container, and is used in conjunction with the carrier terminal to complete the positioning and monitoring of the entire container. The container monitoring terminal includes a second main control chip, a positioning module, a second short-range communication device, a second remote communication device, and a power supply. The container monitoring terminal is attached to the outer wall of the container or hung on the door in the form of an electronic lock.

The second main control chip is connected with the positioning device, the second short-range communication device, the second remote communication device, and the power supply, and controls the work of the above-mentioned internal modules through MCU. The positioning module adopts single-point positioning, the positioning accuracy is 5-10 meters, and the cost is low. After receiving the information from the carrier's first short-range communication device, the second short-range communication device returns its own information, determines whether the container and the carrier match according to the received information, and sends the matching result to the remote digital monitoring platform through the first remote communication device, if the matching fails, starting the alarm device. The second short-range communication device also periodically transmits radio frequency waves, and the sensor sends data to the second short-range communication device after being activated. The remote communication adopts 4G/5G/satellite communication to send the collected data to the remote digital monitoring platform.

(3) The remote digital monitoring platform is mainly used to record and display the identification information and status information of the carrier and the container and their associated status, and monitor the status of the container. It is mainly composed of trajectory filling and matching module, GIS map visualization module, container information query management module, state monitoring and early warning module, carrier-container association binding module, communication module and database module.

The database is used to save the information received from the carrier terminal and the container monitoring terminal, and the received information includes the static identification data and dynamic status data of the carrier and the container.

The trajectory completion and matching module, the GIS map visualization module, the state monitoring and early warning module, and the communication module mainly access the dynamic data of the container.

The communication module writes the information received from the carrier terminal and the container monitoring terminal into the database; The trajectory completion and matching module reads trajectory dynamic data from the database, and uses related algorithms to fill and match trajectory data; The GIS map visualization module displays the corrected trajectory data on the electronic map; The state monitoring and early warning module visualizes other data charts such as temperature, humidity, pressure, etc., and alarms when the temperature, humidity, pressure, etc. exceed the set threshold.

The carrier-container association and binding module is used to realize the association and binding of the container and the carrier;

The container information query management module accesses the static data of the carrier and the container, and queries the basic information of the carrier and the container.

The carrier table in the database records carrier-related attribute information, such as carrier number, driver information, etc., where the carrier number is the main keyword; The container table records the relevant attribute information of the container, such as the container number, cargo information, origin, destination and other information, in which the container number is the main keyword; The container log table records the running track of the container, such as container number, latitude and longitude, receiving time, temperature and humidity, pressure, etc., of which the container number is the main keyword.

The GIS map visualization module can display the carrier's position in an electronic map by querying the container number or carrier number, and can play back the trajectory of the container in a certain period of time. In addition, geo-fences of different shapes can also be set to monitor the running track of the container. When the container is driving on the road, a driving route is preset in the system in advance, and when the container running deviates from the preset driving route, an alarm is issued, and when the container stays in the yard, a geo-fence is set as the shape of the yard boundary.

Figure 2:
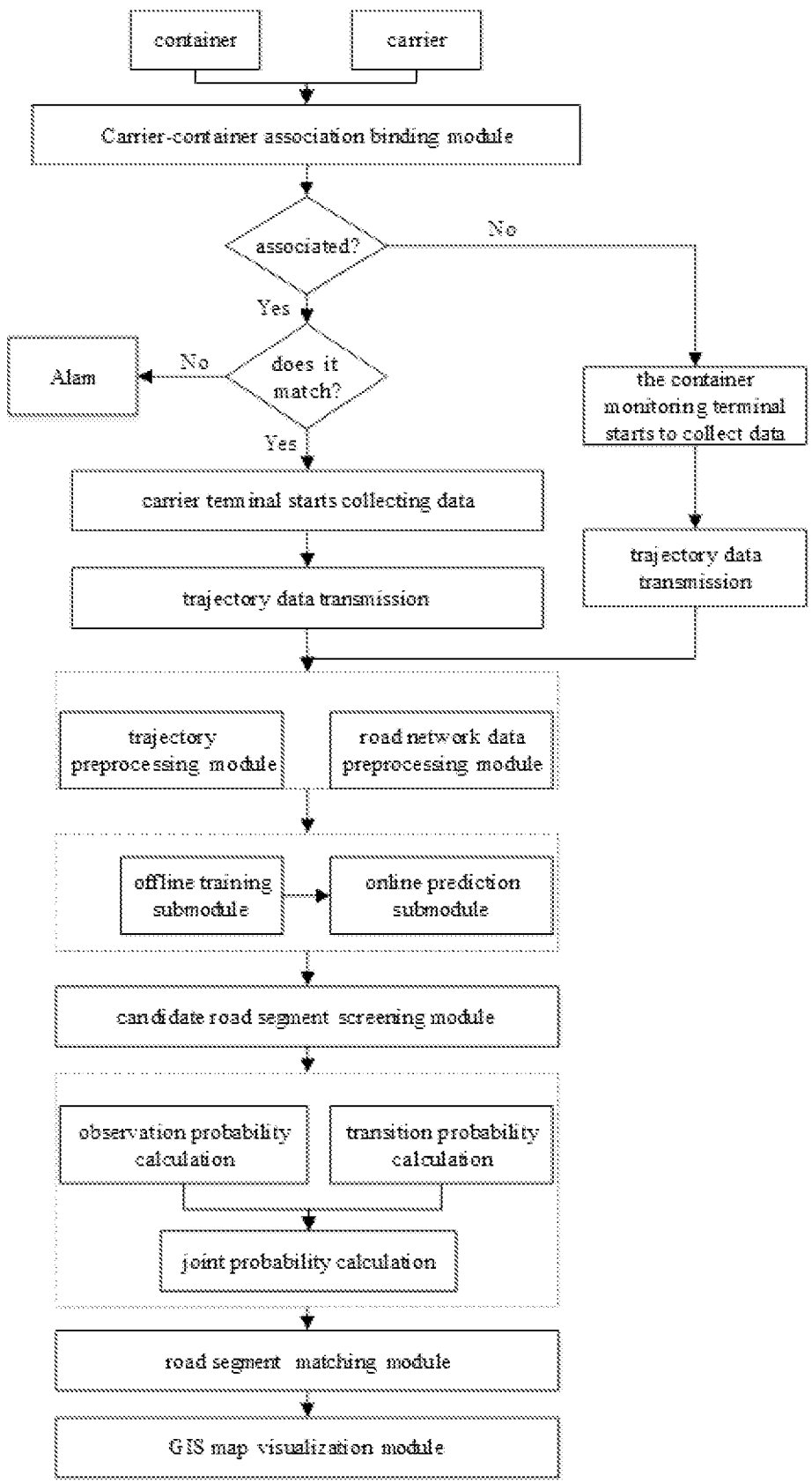
FIG. 2 is the method flow chart of an embodiment of digital association and high precision positioning and tracking system for multimodal transport container.

Under the above system framework, different from ordinary vehicle positioning, container positioning has two main problems: (1) The problem of trajectory missing and trajectory drift caused by the loss of positioning signals of containers in complex environments; (2) The connection problem of container positioning information in multimodal transport environments such as highways, railways, and waterways. In order to solve these two problems, the embodiment of this disclosure creatively proposes a carrier-container digital association method and a data-driven container trajectory filling and matching algorithm; Integrating these two methods into the designed system can effectively improve the positioning accuracy and trajectory accuracy of the container. The following is a detailed description of the process, and the process is shown in FIG. 2.

Step (1) is performed on the carrier-container association and binding module.

(1) Container-carrier association binding. Before the container is mounted on the carrier, the remote digital monitoring platform issues the master key to the carrier terminal. When the second short-range communication device of the container enters the signal transmission range of the first short-range communication device of the carrier, key matching is performed, and the matching result is returned to the remote monitoring digital platform. The associated binding of carrier-container can reduce the misloading rate of containers, improve operation efficiency, and prevent subsequent container positioning errors caused by matching errors.

1) If the matching is successful, the remote digital monitoring platform sets the container-carrier to the associated state, and starts the carrier terminal to transmit high-precision positioning information and other status information to the remote digital monitoring platform;

2) If the matching is unsuccessful, the alarm device of the container monitoring terminal will issue an alarm;

3) When the container is unloaded from the carrier, the unloading information is sent to the remote digital monitoring platform through a handheld device or other devices, the carrier and the container are unbound, and the container and the carrier are set to a non-associated state. And then starting the container monitoring terminal to start transmitting status information to the remote digital monitoring platform. If the container is transferred to another carrier, repeating step 1)-step 3).

(2) Container trajectory data collection. The positioning device collects the latitude and longitude, direction angle, instantaneous speed, and time stamp information of the container's location. In order to reflect the running state of the container and provide data support for trajectory filling and matching, the OBD interface is used to obtain the speed, acceleration, and other data of the carrier during the driving process. This data can also be obtained through acceleration sensors, gyroscopes, etc. The remote digital monitoring platform can set the data transmission frequency, generally 30-300 seconds/time.

Step (3) to Step (8) are performed in the map filling and matching module, aiming at in-transit positioning.

(3) Trajectory data preprocessing. According to the positioning start and end time constraints of the carrier-container association and binding module, the corresponding trajectory data is extracted from the database to the trajectory preprocessing module. When the distance between adjacent trajectory points does not exceed the set distance threshold and the speed is less than the speed threshold, it is determined that the track point is a redundant point and is deleted. When the speed exceeds the maximum speed limit or the latitude and longitude exceed the geofence latitude and longitude limit, the trajectory point is determined to be an abnormal point and deleted. And then deleting points with 0 speed and points with missing latitude and longitude.

(4) Road network data preprocessing. Obtaining road network data in the area from map service platforms such as OpenStreetMap; In the road network data preprocessing module, a directed graph is established to extract road nodes and road segments; The node attributes include the node number and the node coordinates, and the road segment attributes include the road segment number, the coordinates of the starting and ending points of the road segment, and the road grade.

Figure 3:
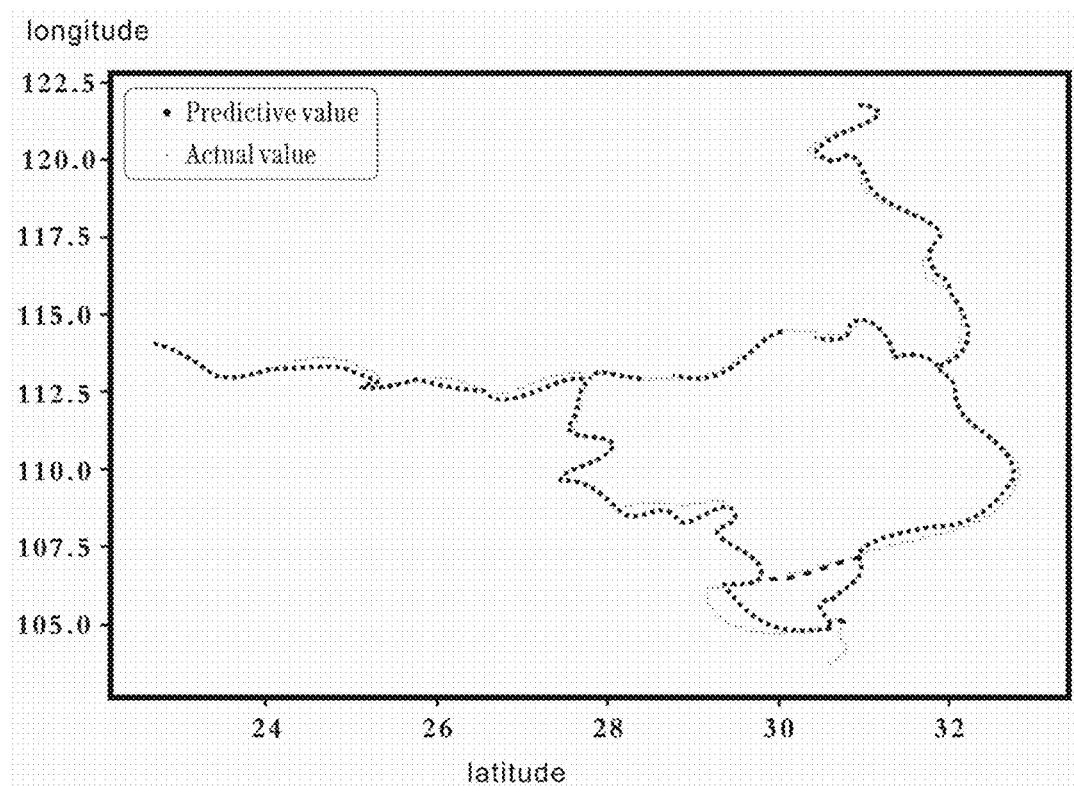
FIG. 3 is a trajectory prediction effect diagram of an embodiment of this disclosure.

(5) Missing trajectory point prediction. The missing trajectory point prediction module contains an offline training submodule (trained in advance) and an online prediction submodule. The offline training sub-module adopts a multi-input-single-output long short-term memory network (LSTM) model, selects the longitude, latitude, time difference, distance, speed, and acceleration of the trajectory data as features, and uses a sliding window to sequentially extract the first 10 time steps. The data is input to the model as a training sample, and the 11th data is used as a label to train the weights and biases. The online prediction sub-module predicts the longitude and latitude of the missing track point of the container; When the carrier/container passes through the place where the satellite signal is blocked and the trajectory is missing, input the data of the first 10 time points of the track point into the trained LSTM network model, the predicted value is the longitude and latitude of the time point, and add the predicted longitude and latitude value to original trajectory sequence. Repeating this operation until the satellite signal returns to normal. The trajectory prediction effect is shown in FIG. 3.

(6) Candidate road segment screening. the candidate road segment screening module is used to create a candidate road segment set, determine an MBR area according to the positioning error of the used positioning equipment, and search for the adjacent nodes of each trajectory point in the trajectory sequence; if a road segment is within the MBR area and the speed limit value of the road segment is greater than the carrier speed, this road segment is added to the candidate road segment set, and the vertical projection point from the trajectory point to the candidate road segment is the candidate point.

(7) Joint probability calculation. The joint probability calculation module calculates the observation probability and transition probability of the trajectory points. The distance and direction factors are comprehensively considered when calculating the observation probability. Considering the distance factor, it is assumed that the observation error of the positioning device (the distance between the observation point and the candidate point) obeys a Gaussian distribution with a mean of 0 and a variance of the standard deviation of the positioning error. Considering the direction factor, the observation probability is expressed as the cosine value of the direction angle of the candidate road segment and the direction angle of the carrier speed, and is limited to the range of 0 to 1, and the product of the two is used as the final observation probability. In order to reduce the time complexity, the observation probability of the road segment with a distance of more than 200 meters from the observation point is set to 0. The transition probability is expressed as an exponential function of the difference between the observed distance of two adjacent trajectory points and the distance of the corresponding candidate point, and the smaller the difference between the two, the greater the probability of the candidate point. The product of the observation probability and the transition probability is the joint probability.

Figure 4:
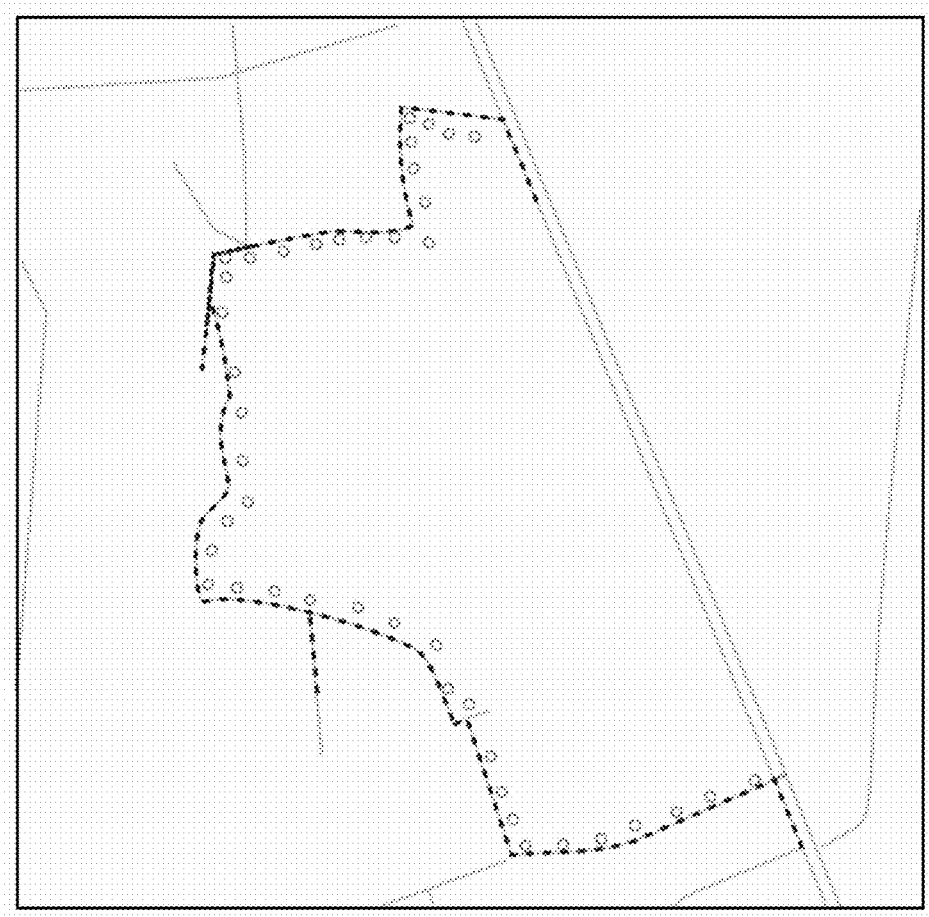
FIG. 4 is a trajectory matching effect diagram of an embodiment of this disclosure.
Figure 5:
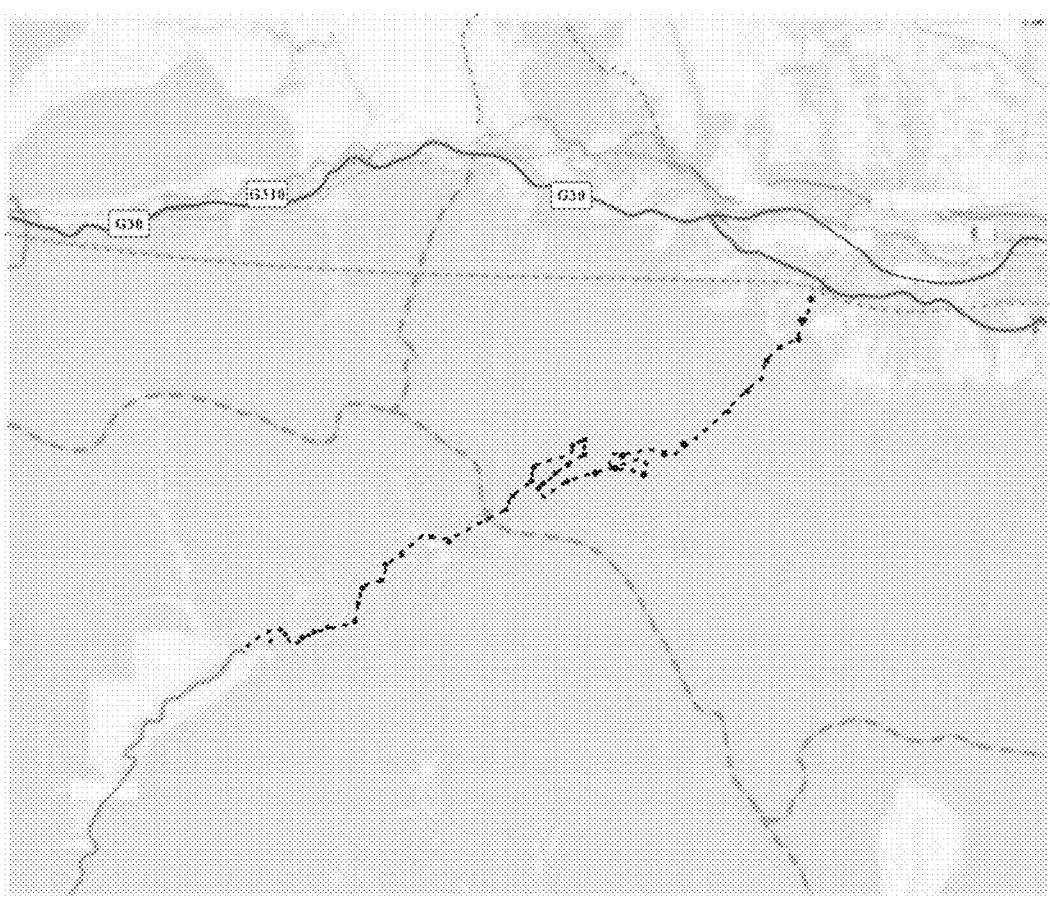
FIG. 5 is a container positioning tracking effect diagram of an embodiment of this disclosure.

(8) Matching point determination. The road segment matching module gradually solves the joint probability of all reachable trajectory points from the starting trajectory point until the last trajectory point is reached. Backtracking from the trajectory end point with the largest joint probability obtains the optimal matching road segment, which is the result of the final map matching. The trajectory matching effect is shown in FIG. 4.

Step (9) is performed in the GIS map visualization module, the state monitoring, and early warning module.

(9) Trajectory visualization. Receiving the position of the trajectory point of the optimal matching road section, and displaying the position of the container after the deviation correction through the algorithm through the Web GIS interface of the remote digital monitoring platform. Accessing the log table to obtain the original positioning trajectory data and displaying it on the map, and displaying other information of the container. In the container information query management module, the current position and information of a container can be inquired through the container number, and the historical change chart of the container's temperature, humidity, pressure, and other status data can be displayed in the state monitoring and early warning module.

Compared with the existing container positioning technology, the advantages of the embodiments of the present invention are: (1) Container in-transit positioning solves the problems of high energy consumption and short battery life for container positioning and communication with the help of carrier terminal. The container monitoring terminal is only used to locate and monitor the non-associated state of the container; (2) The connection between the container and the carrier in the process of multimodal transport is solved through the binding of the container and the carrier and the alarm device of the container. Only the carrier that is successfully matched can transport a container, which ensures the safety of the container; (3) Using the container motion state, positioning data, machine learning prediction algorithm, and matching algorithm to correct the trajectory points, which reduces the cost compared to upgrading the hardware.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A digital association and high precision positioning and tracking system for multimodal transport container, comprising a carrier terminal, a container terminal, and a remote digital monitoring platform;

the carrier terminal is activated when a container is in an associated state, which is used to realize the matching of the container and the carrier, the collection of first positioning information of the container and other status information, and the transmission of the collected information to the remote digital monitoring platform;

the container terminal is activated when the container is in a non-associated state, which is used to match the container and the carrier, collect the container status information, and send the matching result and collected information to the remote digital monitoring platform, wherein when the container enters signal transmission range of the carrier, a key matching is performed, if the key matching is successful, the container is set to the associated state, if the key matching is unsuccessful, the carrier and the container are unbound, the container is set to the non-associated state;

the remote digital monitoring platform is used to send instructions to control the association and unbinding of the carrier and the container, and set the associated state or the non-associated state according to the matching result returned by the container; the remote digital monitoring platform also records and displays the identification information and status information of the carrier and the container according to the received information, and monitors the status of the container.

2. The digital association and high precision positioning and tracking system for multimodal transport container according to claim 1, wherein:

the carrier terminal includes a first main control chip, a first positioning module, an on-board diagnostic (OBD) interface, a first short-range communication device, and a first remote communication device; the first main control chip is respectively electrically connected with the first positioning module, the OBD interface, the first short-range communication device and the first remote communication device;

the first positioning module is used to obtain the first positioning information, and send the first positioning information to the first main control chip;

the OBD interface is connected to the on-board diagnostic system of the carrier, so as to obtain the state information of the carrier, and send the state information of the carrier to the first main control chip;

the first short-range communication device is used for key matching with the second short-range communication device of the container terminal; the first short-range communication device is also used to acquire container information and sensor information, and send the acquired information to the first main control chip;

the first main control chip is used to control the first positioning module, the OBD interface, the first short-range communication device, and the first remote communication device to work; and send the received information to the remote digital monitoring platform.

3. The digital association and high precision positioning and tracking system for multimodal transport container according to claim 2, wherein:

the first positioning information obtained by the first positioning module includes: longitude and latitude, azimuth, instantaneous speed, and timestamp data of the carrier;

the state information of the carrier obtained by the OBD interface includes: engine speed, vehicle speed, and fuel consumption data of the carrier.

4. The digital association and high precision positioning and tracking system for multimodal transport container according to claim 1, wherein:

the container terminal includes a second main control chip, a second positioning module, a second short-range communication module, a second remote communication device, an alarm device, and a power supply; the second main control chip is respectively connected with the second positioning module, the second short-range communication device, the second long-range communication device, the alarm device, and the power supply;

the second positioning module is used to obtain the second positioning information of the container in the non-associated state, and send it to the second main control chip;

the second short-range communication device is used for key matching with the first short-range communication device of the carrier terminal, and sends the matching result to the remote digital monitoring platform through the second remote communication device; the second short-range communication device is further configured to acquire the data information sent by the sensor after being activated, and forward it to the second main control chip;

the alarm device is used to issue an alarm when the carrier and the container are incorrectly matched;

the power supply is used to supply power to the container terminal;

the second main control chip is used to control the positioning module, the second short-range communication device, the second remote communication device and the alarm device to work, and send the received information to the remote digital monitoring platform.

5. The digital association and high precision positioning and tracking system for multimodal transport container according to claim 1, wherein:

the remote digital monitoring platform includes a trajectory filling and matching module, a Geographic Information System (GIS) map visualization module, a container information query management module, a state monitoring and early warning module, a carrier-container association binding module, a communication module, and a database;

the communication module is used to receive the information sent from the carrier terminal and the container terminal, and send data and control instructions to the carrier terminal and the container terminal;

the database is used to save the information received from the carrier terminal and the container terminal, and the received information includes the static identification data and dynamic status data of the carrier and the container;

the carrier-container association and binding module is used to realize the association and binding of the container and the carrier;

the container information query management module is used to access the carrier and container data in the database;

the trajectory completion and matching module is used to read trajectory dynamic data of the container from the database, and fill and match the trajectory data of the container, so as to realize the correction of the trajectory data of the container;

the GIS map visualization module is used to display the corrected container trajectory data on an electronic map;

the state monitoring and early warning module is used to compare the dynamic data of the carrier and the container with a preset threshold, and alarm when the preset threshold is exceeded.

6. The digital association and high precision positioning and tracking system for multimodal transport container according to claim 5, wherein:

the carrier-container association and binding module is used to implement the association binding between the container and the carrier; before the container is loaded on the carrier, the remote digital monitoring platform issues a master key to the carrier terminal; when the container enters the identification range of the carrier's first short-range communication device, key matching is performed, and the matching result is returned to the remote monitoring digital platform through the second remote communication device; if the match is successful, the container is set to the associated state; in the associated state, the remote digital monitoring platform sends an instruction to enable the carrier terminal; if the match is unsuccessful, the alarm device of the container terminal will give an alarm, and the container will be set to a non-associated state by requesting the remote digital monitoring platform to unbind the container-carrier; in the non-associated state, the remote digital monitoring platform will send instructions to enable the container terminal.

7. The digital association and high precision positioning and tracking system for multimodal transport container according to claim 5, wherein:

the trajectory completion and matching module includes a trajectory preprocessing module, a road network data preprocessing module, a missing trajectory point prediction module, a candidate road segment screening module, a joint probability calculation module, and a road segment matching module;

the trajectory preprocessing module is used to preprocess the trajectory dynamic data of the container, and send the preprocessed results to the missing trajectory point prediction module;

the road network data preprocessing module is used to preprocess the road network data in the area where the container is located, and send the preprocessed results to the missing trajectory point prediction module;

the missing trajectory point prediction module is used to predict the missing trajectory points of the container according to the results received from the trajectory preprocessing module, and send the predicted results to the candidate road segment screening module;

the candidate road segment screening module is used to create a candidate road segment set according to the prediction result sent by the missing trajectory point prediction module, and send the candidate road set to the joint probability calculation module;

the joint probability calculation module is used to calculate the product of the observation probability and the transition probability of the trajectory points according to the candidate road set; the result of the product is the joint probability of the trajectory points, and the joint probability of the trajectory points is sent to the road segment matching module;

the road segment matching module is used to gradually solve the joint probability of all reachable trajectory points from the starting trajectory point until the last trajectory point is reached; the optimal matching road segment is obtained by backtracking from the trajectory end point with the largest joint probability, which is the result of map matching, and the matching result is sent to the GIS map visualization module.

8. The digital association and high precision positioning and tracking system for multimodal transport container according to claim 7, wherein:

the trajectory preprocessing module is used to extract the corresponding trajectory data from the database according to the positioning start and end time constraints for the association and binding of the container and the carrier; when the distance between adjacent track points does not exceed the set distance threshold and the speed is less than the speed threshold, it is determined that the track point is a redundant point and is deleted; when the speed exceeds the maximum speed limit or the latitude and longitude exceeds the geofence latitude and longitude limit, the track point is determined to be an abnormal point, and it is deleted, and the track point with the speed of 0 is deleted, and the track point with the missing latitude and longitude is deleted; and then the preprocessed results are sent to the missing trajectory point prediction module;

the road network data preprocessing module is used to obtain the road network data in the area, establish a directed graph to extract road nodes and road segments, add the intersection or end point of the road to a node set, and add the road segment between two nodes to an edge set; and then sending the preprocessed road network data results to the missing trajectory point prediction module;

the missing trajectory point prediction module is used to predict the longitude and latitude of the missing trajectory point of the container; when the carrier/container passes through the place where the satellite signal is blocked and the trajectory is missing, inputting the data of the N time points before the missing trajectory point into a trained long and short-term memory (LSTM) network model, the predicted value is longitude and latitude of the time point, and the predicted longitude and latitude value is added to the original trajectory sequence, repeating this operation until the satellite signal returns to normal; during offline training, the longitude, latitude, time difference, distance, speed, and acceleration of trajectory data are selected as features, and the data of the first N time steps are extracted by sliding window as training samples, the LSTM model with multi-input-single-output long-short term memory network is input, and the N+1 data is used as a label to train the weight and bias through the model;

the candidate road segment screening module is used to create a candidate road segment set, determine an Master Boot Record (MBR) area according to the positioning error of the used positioning equipment, and search for the adjacent nodes of each trajectory point in the trajectory sequence; if a road segment is within the MBR area and the speed limit value of the road segment is greater than the carrier speed, this road segment is added to the candidate road segment set, and the vertical projection point from the trajectory point to the candidate road segment is the candidate point;

the joint probability calculation module is used to calculate an observation probability and a transition probability of the trajectory point; when calculating the observation probability, the distance and direction factors are considered comprehensively; considering the distance factor, the distance between the preset observation point and the candidate point obeys a Gaussian distribution with a mean of 0 and a variance of the standard deviation of the positioning error; considering the direction factor, the observation probability is expressed as the cosine value of the direction angle of the candidate road segment and the direction angle of the carrier speed, and is limited to the range of 0~1, and the product of the two is used as the final observation probability; the observation probability of the road segment whose distance from the observation point exceeds the preset distance length is set to 0, and the transition probability is expressed as the exponential function of the difference between the observation distance of two adjacent trajectory points and the distance of the corresponding candidate point; and the smaller the difference between the two, the greater the probability of the candidate point, the product of the observation probability and the transition probability is the joint probability, and the calculation result is sent to the road segment matching module;

the road segment matching module is used to gradually solve the joint probability of all reachable trajectory points from the starting trajectory point until the last trajectory point is reached; the optimal matching road segment is obtained by backtracking from the trajectory end point with the largest joint probability, which is the result of map matching, and the road matching result is sent to the GIS map visualization module.

* * * * *